(No Model.)
T. THURBER
CAR WHEEL.
No. 287,888. Patented Nov. 6, 1883.
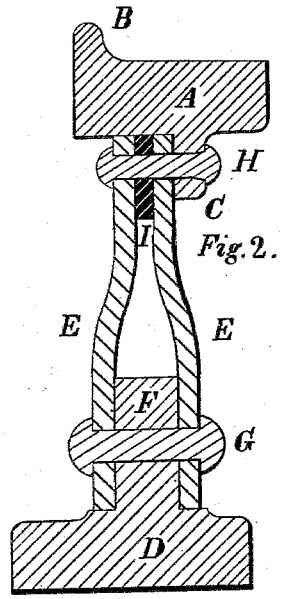
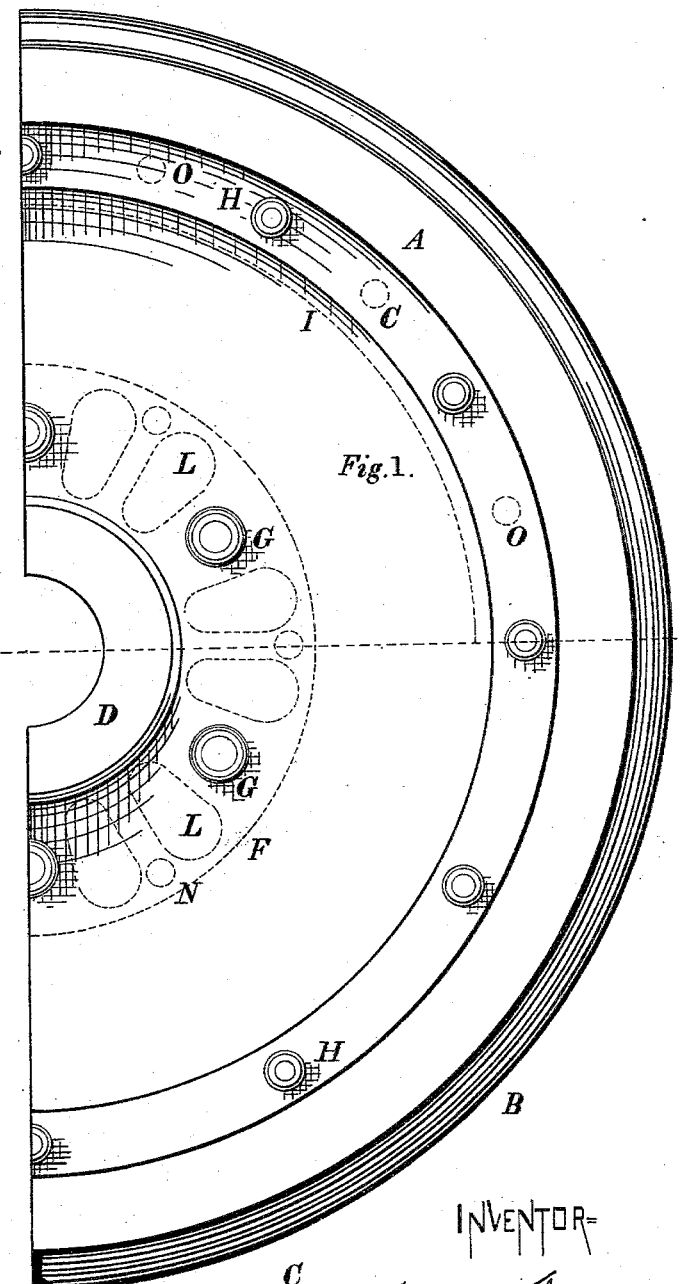
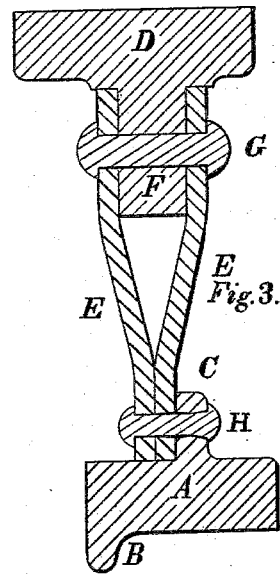
WITNESSES=
A. R. Selden.
H. G. Phillips.
INVENTOR=
Theodore Thurber.
by Geo. B. Selden
atty

UNITED STATES PATENT OFFICE.

THEODORE THURBER, OF AUBURN, NEW YORK.

CAR-WHEEL.

SPECIFICATION forming part of Letters Patent No. 287,888, dated November 6, 1883.

Application filed March 24, 1883. (No model.)

*To all whom it may concern:*

Be it known that I, THEODORE THURBER, of Auburn, in the county of Cayuga and State of New York, have invented a new and Improved Car-Wheel, of which the following is a specification.

My invention relates to that class of wheels in which the rim or tire is removably attached to web or body plates which are formed upon or secured to a central supporting-hub.

It is the particular aim of my invention to produce a wheel which shall possess the greatest possible strength consistent with moderate weight, to facilitate the removal and renewal of the tire or rim without disturbing the remaining portions of the wheel and without removing the wheel from the axle, and to so dispose the parts with respect to each other that the rivets or bolts by which the tire is secured in position shall be relieved to a great extent from strain.

To this end it consists, essentially, in a wheel the body of which is composed of two distinct plates or disks separated at the center and converging toward the periphery, their outer edges being seated within the flange or tire against the inside face of a flange or shoulder extending around the interior of said tire. The outer edges of the plates seated directly against each other or against opposite sides of an intervening ring are secured to the flange of the tire by transverse rivets or bolts, while the parts are arranged in such manner that the weight and strain applied to the rim are transmitted directly to the plates, instead of being transmitted thereto through the rivets or bolts. The holes through which the rivets pass in the flange of the tire and in that body-plate which lies next to the flange are enlarged or made of conical form, thus producing a free space around the rivet and preventing a lateral shearing strain thereon.

Referring to the accompanying drawings, Figure 1 represents a side elevation of a portion of a wheel constructed on my improved plan, the dotted lines indicating internal parts which are concealed from view. Fig. 2 represents a central cross-section through one side of the wheel in its preferred form. Fig. 3 is a similar section of a wheel in a slightly-modified form. Fig. 4 is a cross-section, on an enlarged scale, through one edge of the tire, the sustaining-plates, and the rivet by which they are united, showing clearly the space formed around the rivet for the purpose of relieving the same.

A represents the tire or rim of the wheel, constructed in one continuous piece of steel by any of the ordinary processes or manipulations with which those skilled in the art are familiar. This rim is provided with the usual annular flange on the periphery, and is also provided with a continuous internal flange, C, located substantially beneath the tread or face of the tire.

D represents the hub of the wheel, provided with the usual central opening for the reception of the axle, and with a peripheral or radial flange, F, located centrally of the length of the hub, or substantially so.

E E represent the two body-plates by which the rim and wheel are united. These plates are made of a circular form, and are each made of a dished or concave form in cross-section, as illustrated in the drawings. At the center these plates are perforated to receive the hub from which they are applied from opposite ends, so as to bear against opposite sides or faces of the flange F, to which they are firmly secured by means of transverse rivets or bolts G. The plates are constructed to approach each other toward the outer edge, being brought either directly against each other, as represented in Fig. 3, or against opposite sides of an intermediate ring, I, introduced between them, as shown in Fig. 2. The two plates have their outer edges seated firmly against the interior of the tire or rim, both on the inner side of the flange C. The arrangement of both plates upon the same side of the flange, as shown, is of importance, in that it permits the tire to be readily removed without disconnecting the plates from each other or of removing the wheel from the axle.

In constructing the wheel the outer edges of the two plates and the inner edge or face of the tire are ordinarily beveled to a slight extent, and the plates placed in position by means of a hydrostatic press or equivalent means, by which they are forced closely to their places and seated in intimate contact with the surface of the rim, although, if preferred, the tire may be heated and shrunk into place upon the plates. The intimate contact referred to is of importance, in that it causes the strain to be transmitted from the tire directly to the plate, thereby avoiding undue strain upon the connecting-rivets. After being placed in position, the plates are secured to each other and upon the flange C by means of the transverse rivets or bolts H. Owing to the fact that the flange C is located outside of the plates, it will be perceived that the lateral strains brought upon the tire when in use are communicated through its flange C directly to the side faces of the plates E.

It is to be noted that, owing to the convergence of the plates E E toward the periphery, they constitute, in effect, an arch within the tire, to sustain the same, and that consequently lateral strains applied in either direction upon the rim will have a tendency to compress or crush the plates beneath, the action in this respect differing materially from that of a straight plate, which would be subjected to a tensile strain, and would consequently transmit a severe strain to the rivets. The dished or concave form of the plates E admits of their being safely forced into position under a slight degree of compression, so that they may expand and contract to accommodate themselves to the varying diameter of the tire, whereby an intimate contact is maintained under all conditions between the outer edges of the plates and the inner surface of the tire.

The employment of the ring I between the outer edges of the plates is for the purpose of giving an increased width or support to the bearing thereunder. Good results, however, may be obtained when this ring is omitted and the plates brought into contact at the periphery, as represented in Fig. 3.

For the purpose of giving the wheel the highest possible degree of stiffness consistent with a moderate weight, I prefer to extend the flange F of the hub outward a considerable distance between the plates, as shown, and to provide the same with a series of openings or cavities, L, as indicated by dotted lines in Fig. 1, these cavities or recesses reducing the amount of metal, and consequently the weight of the wheel. As an additional protection to prevent the strains to which the parts are subjected in practice from applying a lateral or shearing strain to the rivets H, I form the holes in the flange C and in the plate E, which bears against the same, of conical form, or of increasing diameter toward their proximate faces, as plainly represented in Figs. 3 and 4. In this manner I produce a space or opening around the rivet sufficient to permit a slight lateral motion of the plate E with respect to the flange C without producing a shearing strain on the connection.

Care should be taken, in the application of the bolts or rivets, to see that they are not upset in such manner as to fill the surrounding space or cavity referred to. To this end it is recommended that when rivets are employed they be heated at one end only.

It will be observed that in my wheel the outer edges of the converging supporting-plates are located nearly beneath the center of the tire and substantially opposite that portion of the tread which rides ordinarily upon the rail. In this manner the tire receives a direct support opposite the point at which the strain is applied, so that in the event of thin tires being employed, or of the tires being materially reduced in thickness by wear, there will be little or no liability of their being fractured or of their losing their proper form, as would be the case were the support received at a point out of line with the rail.

Another advantage arising from the use of the curved or dished plates E consists in the fact that I am enabled, by slightly modifying the curvature of said plates, to vary the position of the hub endwise in respect to the tire of the wheel, whereby I am enabled to adapt my wheels to the varying requirements of different roads and builders.

I am aware that car-wheels consisting of hubs, tires, and intermediate connecting-plates from which the tire was removable have been constructed in a variety of forms, and that removable tires for car-wheels have been constructed with an internal flange to receive bolts, by which they were secured in position; but I am not aware that any one has hitherto combined with the internally-flanged tire two internal plates having a convergence toward the outer edge and both secured in position upon the inner side of the tire-flange.

The present invention is restricted to those matters and things which are hereinafter claimed, and as to all matters which may be described or shown, but which are not claimed, the right is reserved to make the same the subject of a separate application.

Having thus described my invention, what I claim is—

1. In a car-wheel, the tire or rim provided with the internal flange, C, in combination with the two sustaining-plates converging from the inner toward the outer edges, said plates being both located on the inside of the flange C and secured thereto by transverse bolts or rivets, substantially as described.

2. In combination with the tire or rim having the internal flange, C, the hub provided with the surrounding flange, and the two dished or concave plates E, having their inner edges secured to opposite faces of the hub-flange and their outer edges secured upon one and the same side of the flange of the tire.

3. In combination with the tire or rim provided with the internal flange, the plates or disks converging from the inner to the outer edge, the intermediate ring between the outer edges of said plates, and bolts or rivets, applied substantially as described, to connect said plates with the flange of the tire.

4. In combination with the tire having the internal flange, the two sustaining-disks mounted on one and the same side of said flange, and bearing firmly against the inside of the tire, and the transverse bolts extending through the plates and the flange, the holes for said rivets being enlarged to leave a space around the rivets, in the manner and for the purpose described.

5. In combination with the flanged hub, the plates E E, of dished or concave form, secured at their inner edges to opposite sides of said flange, and beveled at their outer edge, the internally-flanged tire having its inner surface beveled and seated against the outer edges of the plates, and the bolts or rivets uniting the plates and the flange of the tire, as described.

6. In combination with the cylindrical connecting-bolts H, the sustaining-plate E and the flange C upon the tire, both provided with conical or tapering holes to receive the rivets, whereby a space is left around the rivet and a shearing action thereon prevented.

7. In a car-wheel, the combination, with two tire-supporting plates, E, with a central hub having a circumferential flange, F, provided with openings L, as and for the purpose described.

8. In combination with the two plates E, converging toward their outer edges, the tire A, provided with the flange C, the tire being seated solidly against the edges of the plates, and the flanges seated against the outer face of the outer plate.

THEODORE THURBER.

Witnesses:
GEO. B. SELDEN,
H. G. PHILLIPS.